Nov. 30, 1965 H. ZARM 3,220,734

SPEED CHANGER FOR RECORD PLAYERS

Filed April 2, 1962 5 Sheets-Sheet 1

INVENTOR.
HORST ZARM
BY
Frank R. Jinfini
AGENT

Nov. 30, 1965 H. ZARM 3,220,734

SPEED CHANGER FOR RECORD PLAYERS

Filed April 2, 1962 5 Sheets-Sheet 2

INVENTOR
HORST ZARM

BY Frank R. Jirafani
AGENT

INVENTOR
HORST ZARM
BY Frank R. Jeifari
AGENT

Nov. 30, 1965 H. ZARM 3,220,734

SPEED CHANGER FOR RECORD PLAYERS

Filed April 2, 1962 5 Sheets-Sheet 4

INVENTOR
HORST ZARM

BY Frank R. Jenifer
AGENT

Nov. 30, 1965 H. ZARM 3,220,734

SPEED CHANGER FOR RECORD PLAYERS

Filed April 2, 1962 5 Sheets-Sheet 5

INVENTOR
HORST ZARM

BY [signature]
AGENT

United States Patent Office 3,220,734
Patented Nov. 30, 1965

3,220,734

SPEED CHANGER FOR RECORD PLAYERS

Horst Zarm, Berlin-Zehlendorf, Germany, assignor to North American Philips Company, Inc., New York, N.Y., a corporation of Delaware Filed Apr. 2, 1962, Ser. No. 184,382
Claims priority, application Germany, Apr. 25, 1961, P 27,040
6 Claims. (Cl. 274—9)

The invention relates to a device for automatically changing the speed of rotation in apparatus for playing disc-shaped sound recordings having different diameters, in which the disc records of one diameter are used for one speed only and in which a reduction gear adapted to be changed over is interposed between the driving motor and the turntable, said gear being changed over in dependence of a feeler member responding to the record diameter. As disclosed in my earlier filed application Serial No. 77,977, now Patent 3,162,446 such a device has to be designed so that, when used in a semi-automatic reproduction device having a slide adapted to be moved in the direction of insertion of a record by the feeler member through a distance proportional to the record diameter, a coupling is provided between the slide and the devices for changing over the reduction gear which adjusts the gear to the speed of rotation associated with the said record when the slide reaches the position corresponding with the particular diameter of the record.

This invention relates to an improvement in and a simplification of the device according to the above-noted copending application and has the feature that the coupling between the slide and the change-over device of the gear is a switching rod adapted to be revolved about its longitudinal axis and provided with a strip twisted in the manner of an Archimedean drill and adapted to slide in a slit-shaped aperture in the slide on movement thereof so as to turn the switching rod which acts upon the change-over device through a crank or eccentric. It will be appreciated that this results in a particularly simple and inexpensive coupling device with the aid of which the gear may be set to the speed of rotation associated with the particular record inserted.

Such a device may be of particuraly simple design if the turntable is required to have only two different speeds, as is the case in present-day disc records. As is known, speeds of 45 r.p.m. and 33⅓ r.p.m. only are used, the former speed for records of 7 inch diameter and the latter for records of 10 inch and 12 inch diameter.

In such a case the device is preferably designed so that the strip twisted similarly to an Archimedean drill is twisted through 90° in one direction between the point at which the slit-shaped aperture in the slide is positioned in the initial position of the slide and the point at which this aperture is positioned after the insertion of a record of 7 inch diameter, is twisted through 180° in the opposite direction between the latter point and the point at which the slide is positioned after the insertion of a record of 10 inch diameter, but is not twisted between the last-mentioned point and the point associated with a record of 12 inch diameter. Thus the crank or eccentric is set to a particular position for playing 7 inch records and to a different position for playing both 10 inch records and 12 inch records.

The reduction gear used in such devices for playing disc records frequently is a friction wheel arrangement in which a stepped disc is keyed to the shaft of the motor and a friction wheel adapted to be urged by a spring to the said disc to the turntable transmits the movement of the motor to the turntable. The speed of rotation of the turntable is then determined by the step of the stepped disc with which the friction wheel is brought into engagement. Consequently, to change over the speed the friction wheel has only to be axially displaced over the stepped disc, however, it is preferably disengaged from the stepped disc prior to being displaced.

When such a reduction gear is used, the arrangement in accordance with the present invention is advantageously designed so that the friction wheel is journalled in a friction-wheel slide adapted to slide on a strip bent from a friction-wheel support so as to extend parallel to the plane of the turntable, the friction-wheel support being arranged to be moved along and pivoted about a cylindrical spindle extending parallel to the turntable spindle, the end of the switching rod which is bent into the shape of a crank not only engaging between two lugs secured to the friction-wheel support which enable the latter to be shifted but also acting upon a lever which is hinged to the support of the friction-wheel and the free end of which extends into a hole in the slide of the friction-wheel and which is capable of disengaging the friction-wheel from the stepped disc and the turntable against a spring.

In order that the invention may readily be carried into effect, an embodiment thereof will now be described, by way of example, with reference to the accompanying diagrammatic drawings, in which.

Figure 3:
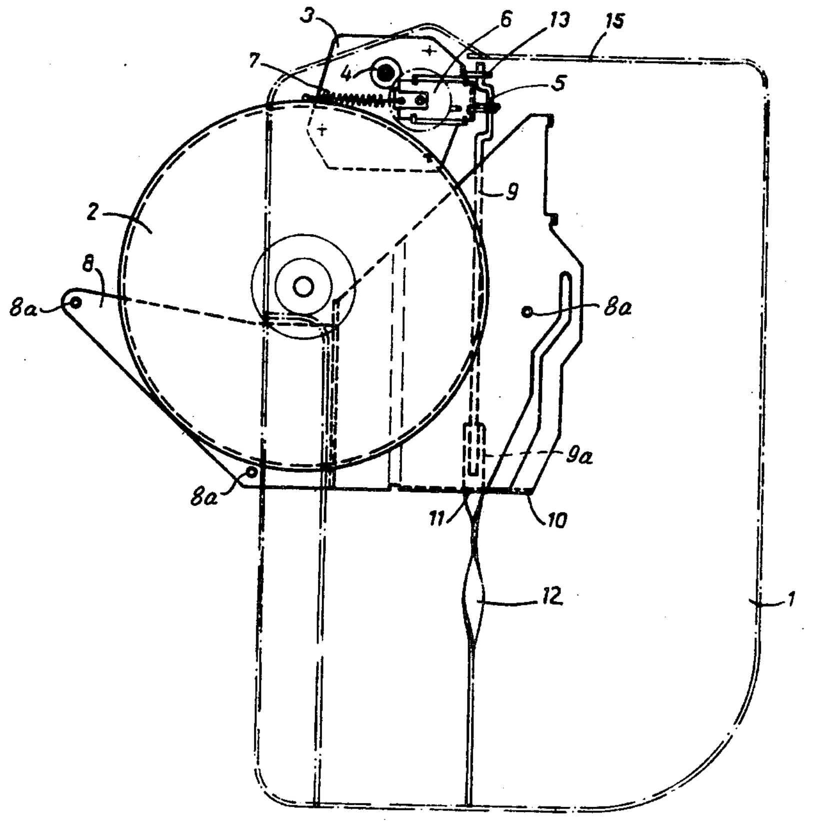
FIGURE 3 shows a plan view of the invention with the parts in a neutral position when no record is in position on the turntable.
Figure 4:
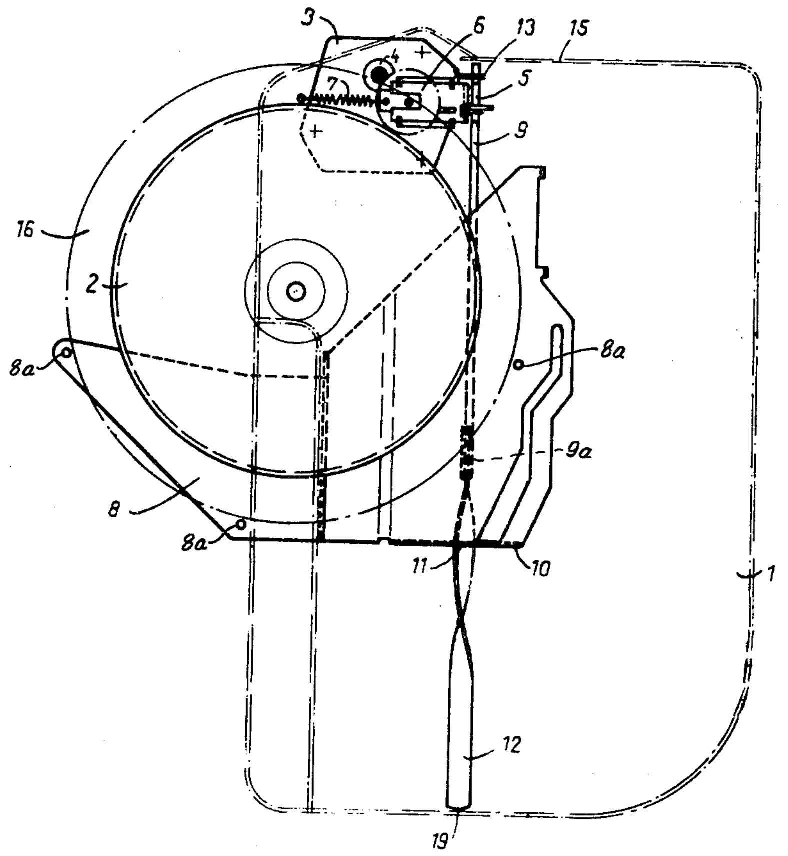
FIGURE 4 shows the same view as FIG. 3 with a record of 7 inch diameter (45 r.p.m. record) inserted.
Figure 5:
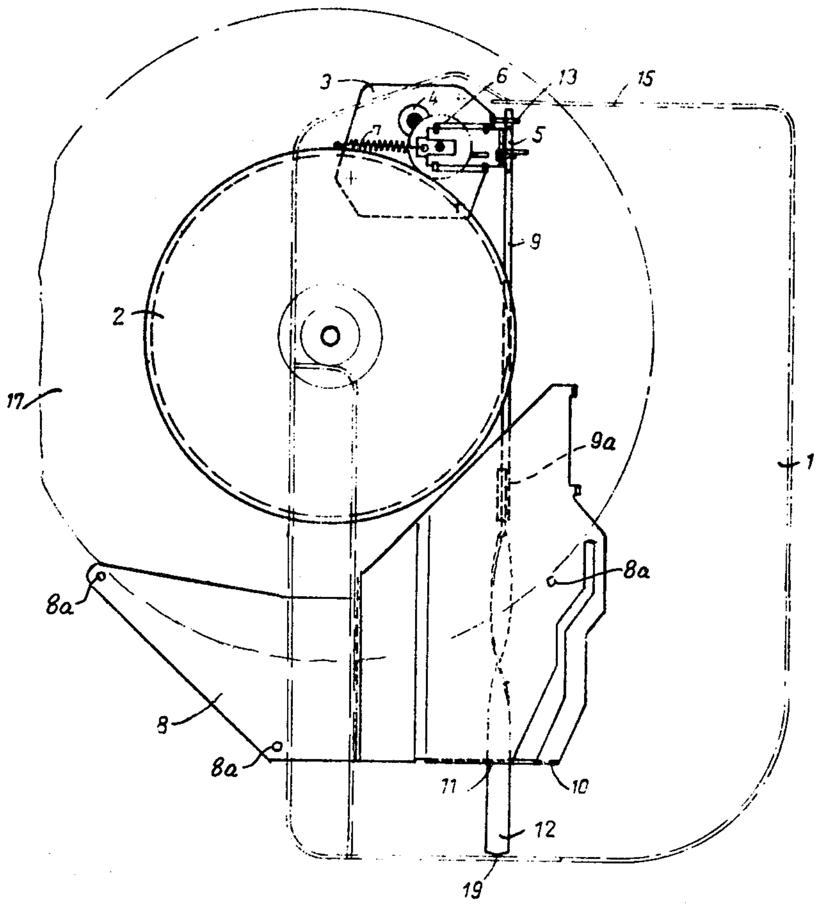
Figure 6:
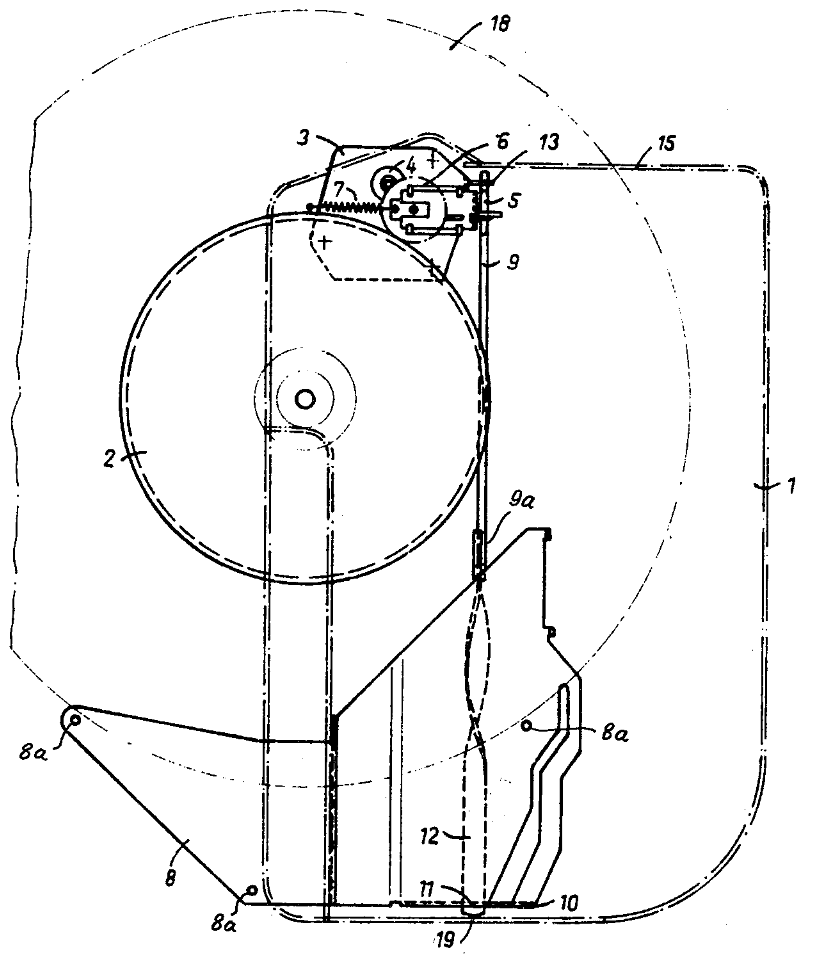

FIGURES 5 and 6 show the same view of FIGS. 3 and 4 with a record of 10 and 12 inch diameter (33⅓ r.p.m. record) inserted.

Figures 1, 2:
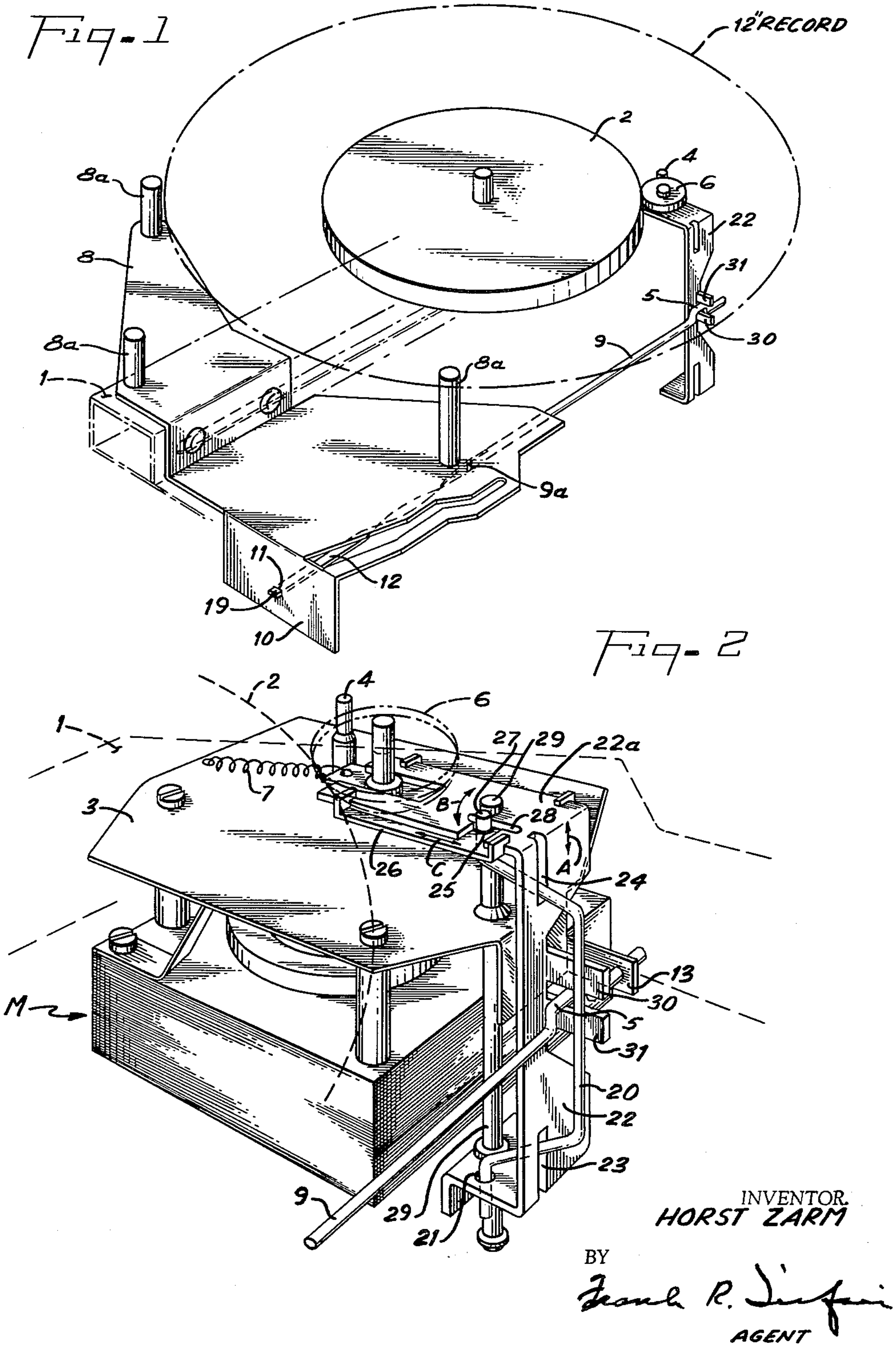
FIGURE 1 is a schematic perspective view of the essential parts of a record player according to the invention.
FIGURE 2 is a detailed perspective view of the improvement according to the invention.

FIGURE 1 shows schematically a turntable 2 journalled in known manner for rotation on a base plate 1. These parts are shown in outline only by broken lines. A motor M (FIG. 2) is mounted under a motor supporting plate 3 but only an upwardly projecting stepped shaft 4 is shown. A slide 8 is movably arranged on the base plate 1 in any suitable manner such as seen in said copending application and is provided with upwardly projecting pins 8*a* which enable it to be displaced by disc records which may be slid (from the side such as the upper right hand corner of the drawing) onto the turntable through a distance proportional to the record diameter. A switch rod 9, having a twisted strip 12 at one end 9*a*, is journalled in bracket 13 on plate 3. The switch rod 9 at 13 with the strip 12 is thus readily rotatable about its longitudinal axis. The twisted strip 12 meshes, through a slit-shaped aperture 11 in a bent over lug 10 of the slide 8 and consequently a displacement of the slide results in a corresponding rotational movement of the switch rod 9. At its other end the switch rod 9 has a part 5 bent into the shape of a crank which is coupled with the support 22 for the friction-wheel 6 and on rotation of the switch rod 9 the friction-wheel performs certain movements as described in connection with FIGS. 3–6.

As seen in FIG. 2, the friction-wheel 6 is journalled in a friction-wheel slide 26 adapted to slide over a strip 22*a* bent from the friction-wheel support 22 so as to extend parallel to the plane of the turntable 2. The friction-wheel support 22 is adapted to be both displaced and pivoted slightly about a spindle 29 extending parallel to the axis of the turntable as shown by arrows A and B. The crank-like part 5 of the switch rod 9 engages between two lugs 30 and 31 bent from the friction-wheel support 22 and hence rotation of this crank causes the friction-wheel support 22 to be raised or lowered along the spindle 29 as indicated by arrow A. The friction-wheel support 22 is also provided with a brace or lever 20 made from spring steel wire the lower end of which is freely disposed in hole 21 so that the lever 20 is adapted to pivot within this hole. The lever 20 passes through slit-shaped apertures 23 and 24 of the friction-wheel support 22 and its upper free end 27 engages in a hole 25 in the friction-wheel slide 26. Since the middle portion of the lever 20 is in the operating range of the crank-like part 5 of the switch rod and the friction-wheel slide 26 is drawn to the left-hand side by a spring 7, the lever 20 engages the crank-like part 5 and when this part 5 is pivoted shifts the friction-wheel slide 26 horizontally as indicated by arrow C. Slot 28 in support 22 allows lever 20 and slide 26 to move relative to the support 22.

Thus, in the position of the component parts shown in FIGURE 2, the crank-like part 5 of the switch rod 9 is in a neutral position with respect to lever 20 so that slide 26 is under the influence of the spring 7 so that the turntable and the motor shaft 4 are engaged. The support 22 is lifted by crank 5 so that wheel 16 engages the upper end of the stepped shaft 4.

As shown in FIG. 3, rotation of crank 5 in a clockwise direction 90° withdraws the friction wheel 6 out of engagement with shaft 4 and the turntable 2. The position shown in FIG. 3 is the neutral position of the parts illustrated in FIG. 2.

When a 7 inch record is inserted, the slide 8 is moved from its initial position to the position shown in FIGURE 4. In this figure a record 16 is shown by a dot-and-dash line. During the movement of the slide 8 the switch rod 9 revolves clockwise through about 90° to the position shown owing to the fact that the aperture 11 and the strip 12 interact in the manner of an Archimedean drill. The crank-like part 5 is disengaged from lever 20 of the friction-wheel support and the spring 7 draws the friction-wheel into its operating position. Since the part 5 is directed downwards, rotated 180° from the position in FIG. 2, the friction wheel now engages the large diameter step of motor shaft 4 so that the turntable rotates at a speed of 45 r.p.m.

FIGURE 5 shows the position after the insertion of a record 17 of 10 inch diameter. The slide 8 is moved still further so as to revolve the switch rod 9 in accordance with the sense of rotation of the twisted strip 12 to a position in which the crank-like part 5 points upwards thus lifting support 22. This position is shown in FIGURE 2 also. Thus with records of the said size the friction-wheel engages a step of smaller diameter of the motor shaft 4 so that the turntable is driven at a speed of 33⅓ r.p.m.

FIGURE 6 shows the position of parts when a record 18 of 12 inch diameter is inserted into the phonograph. The slide 8 is moved to its furthest position. The figure also shows that the strip 12 is straight or planar over its length traversed by slide 8 between the position shown in FIGURES 3 and 4 respectively, that is to say the switch rod 9 is not revolved further than in FIGURES 2 and 5. Consequently, a 12-inch record is also driven at a speed of 33⅓ r.p.m.

During longitudinal movement of the slide 8 from its initial position to the respective operating positions described not only the switch rod 9 is revolved but obviously this rod and the strip 12 are subjected to an axial force. Since, however, the end of the switch rod 9 and the end of the strip 12 are closely adjacent a bent edge of the base plate 1 (note FIGS. 3 to 6) on movement of the slide 8 (in either direction) the switch rod provided with the strip abuts against either one of the walls 14, 15 of the base plate (FIGS. 3–6). Suitable rounding of the strip 12 at the tip 19 (note FIGS. 4 to 6) ensures that the rotary movement of the switch rod is negligibly affected by friction against wall 14. The end of rod 9 adjacent bracket 13 will engage the wall 15 of plate 1 in like manner.

When a medium-size (10 inch) or large-size (12 inch) record is inserted the slide 8 passes from neutral (FIG. 3) through the position for small-size (7 inch) records so that the turntable speed is inevitably set to 45 r.p.m. momentarily, on further displacement of the slide, however, continued rotation of the switch rod 9 by virtue of the shape of strip 12, the friction wheel is again disengaged immediately, returned to the initial position shown in FIGURE 1 and finally brought to the position for a speed of 33⅓ r.p.m.

To ensure that the friction-wheel 6 securely engages the driving member and the edge of the turntable, the vertical guide member, shaft 29, for the friction-wheel support 22 is a cylindrical rod enabling the friction-wheel support 22 not only to be vertically displaced but also to be pivoted through a pre-determined angle to the correct position under the action of a draw-spring 7.

What is claimed is:

1. Automatic speed changer apparatus for a record player, comprising a record player having a turntable and stepped motor shaft and in which a friction wheel is disposed between the turntable and the stepped motor shaft of said record player; the improvement comprising a slideable feeler member, means slideably supporting said feeler member on said record player for engagement by the periphery of a phonograph record and moved thereby in the direction of insertion of a record, means on said record player for supporting said friction wheel for axial movement relative to said stepped motor shaft, a crank operatively connected with said friction wheel supporting means for imparting said axial movement thereto, and an Archimedean drill strip connected with both said crank and said feeler member for driving said crank upon movement of said feeler member.

2. Automatic speed changer apparatus comprising a record player, said record player having a turntable and a stepped motor shaft, and in which a friction wheel is disposed between the turntable and the stepped motor shaft of said record player, a slideable feeler member, means mounting said feeler member on said record player for engagement by the periphery of a phonograph record and moved thereby in the direction of insertion of a phonograph record, means on said record player for supporting said friction wheel for axial movement relative to said stepped motor shaft, said means for supporting said friction wheel including a slideable member for moving said friction wheel into operative and inoperative positions, a crank operatively connected with both said friction wheel supporting means and said slide, and an Archimedean drill strip connected with both said crank and said feeler member for rotating said crank upon movement of said feeler member by insertion of a record into said record player for imparting said axial movement to said means supporting said friction wheel and sequentially moving said slideable member for placing said friction wheel in operative and inoperative position.

3. Automatic speed changer apparatus according to claim 2 wherein said means supporting said friction wheel for axial movement comprises a spindle supported on said record player in a plane parallel with the axis of rotation of said turntable, a friction-wheel support bracket pivotally and axially movably mounted on spindle, said bracket having a pair of spaced lugs outstanding from said bracket in planes substantially normal to said parallel plane, and said crank being operatively positioned between said lugs for said axial displacement of said bracket.

4. Automatic speed changer apparatus according to claim 3 wherein said slideable member for moving said friction wheel to operative and inoperative position comprises a friction wheel slide, a shaft on said slide supporting said friction wheel, means for slideably mounting said friction wheel slide on said bracket for movement in a plane normal with said parallel plane, a lever connected with said bracket and with said friction wheel slide and having its intermediate portion adjacent said crank for engagement therewith, and spring means connected with said friction wheel slide for urging said friction wheel into its operative position.

5. Apparatus for automatically selecting the speed of a record player turntable in accordance with the diameter of a record to be played comprising an operatively connected assembly including a turntable, a variable speed drive including a change over means for driving said turntable, and means for actuating said change over means; said means actuating said change over means including a movably mounted feeler member, said feeler member being positioned in said assembly for engagement by the periphery of a record to be played and moveable by said record in the direction of insertion, an Archimedean drill strip having a length at least equal in length to the greatest distance proportional to the diameter of a record to be played, an elongated slot in said feeler member receiving said drill strip, a crank member rotatably driven by said drill strip, said drill strip driving said crank member in a clockwise direction upon movement of said feeler member in one direction of movement thereof and in a counterclockwise direction upon movement of said feeler member in the opposite direction, and means operatively connecting said crank member with said change over means of said variable speed drive.

6. Apparatus for automatically selecting the speed of a record player turntable according to claim 5 wherein said variable speed drive and change over means for driving said turntable comprises a driven stepped shaft, and a friction wheel driven by said shaft and driving said turntable, a friction wheel support including a bracket, a spindle for mounting said bracket for axial movement in a plane parallel with the plane of the axis of said shaft and pivotal normal to said parallel plane, a pair of lugs outstanding from said bracket in planes normal to said parallel plane, said crank being operatively positioned between said lugs for displacing said bracket axially, a slide supporting said friction wheel on said bracket, means for mounting said slide on said bracket for movement in a plane normal with said parallel plane, a lever, said lever having one end connected with said slide and connected at its other end with said bracket, the intermediate portion of said lever being positioned adjacent said crank for engagement with said crank for moving said slide, and spring means connected with said slide for biasing said slide into a position for placing said friction-wheel in operative position between said stepped shaft and turntable.

References Cited by the Examiner

UNITED STATES PATENTS

| | | | |
|---|---|---|---|
| 2,689,734 | 9/1954 | Wennerbo | 274—9.1 |
| 2,943,861 | 7/1960 | Redfield | 274—9.2 |
| 2,966,358 | 12/1960 | Cleybergh | 274—10 |

LOUIS J. CAPOZI, *Primary Examiner.*

EMIL G. ANDERSON, *Examiner.*